United States Patent
Tsai et al.

(10) Patent No.: US 10,817,633 B2
(45) Date of Patent: Oct. 27, 2020

(54) TIMING MODEL, TIMING MODEL BUILDING METHOD, AND RELATED TOP-LEVEL ANALYSIS METHOD

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Meng-Hsiu Tsai, Hsinchu (TW); Hsin-Hsiung Liao, Hsinchu (TW); Min-Hsiu Tsai, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/425,962

(22) Filed: May 30, 2019

(65) Prior Publication Data

US 2020/0311218 A1 Oct. 1, 2020

(30) Foreign Application Priority Data

Mar. 27, 2019 (TW) .............................. 108110792 A (51) Int. Cl.
*G06F 30/327* (2020.01)
*G06F 111/04* (2020.01)
*G06F 119/12* (2020.01)

(52) U.S. Cl.
CPC ........ *G06F 30/327* (2020.01); *G06F 2111/04* (2020.01); *G06F 2119/12* (2020.01)

(58) Field of Classification Search
USPC ........................................................ 716/103
See application file for complete search history.

(56) References Cited

U.S. PATENT DOCUMENTS

2005/0229128 A1* 10/2005 Sripada .................. G06F 30/33
716/113
2012/0239371 A1* 9/2012 Tehrani ................. G06F 30/367
703/14

* cited by examiner

*Primary Examiner* — Mohammed Alam
(74) *Attorney, Agent, or Firm* — CKC & Partners Co., LLC (57) ABSTRACT

A timing model building method, for building a timing model corresponding to a gate-level netlist of a block, includes the following operations: utilizing a processor to generate an interface net of the gate-level netlist, where if the gate-level netlist comprises an unconstrained clock tree and boundary timing constraint information of the gate-level netlist does not comprise a timing constraint of the unconstrained clock tree, the interface net comprises none of cells of the gate-level netlist driven by the unconstrained clock tree; utilizing the processor to generate an identified internal net of the gate-level netlist, where the identified internal net is cross-coupled to the interface net; and utilizing the processor to generate the timing model according to the interface net and the identified internal net.

20 Claims, 10 Drawing Sheets

TIMING MODEL, TIMING MODEL BUILDING METHOD, AND RELATED TOP-LEVEL ANALYSIS METHOD

CROSS-REFERENCE TO RELATED APPLICATION

This application claims priority to Taiwan Application Serial Number 108110792, filed Mar. 27, 2019, which is herein incorporated by reference in its entirety.

BACKGROUND

Field of Invention

The present disclosure relates to a timing model, a timing model building method, and a top-level analysis method. More particularly, the present disclosure relates to a timing model building method for generating a timing model according to an interface net and an identified internal net.

Description of Related Art

For the functional verification of a complex circuit design, the static timing analysis (STA) is a widely used simulation method. The STA examines each possible timing path in the circuit design, and evaluates whether a timing path faces the timing violation. The STA requires, however, lots of computing resources. Therefore, the industries usually rely on the hierarchical design technique to divide the circuit design into a plurality of blocks, and the block-level analysis is performed to generate timing models corresponding to the plurality of blocks, respectively. Then, the timing models are used to perform the STA of the top-level analysis, so that the required hardware resources and time are reduced. The common categories of timing models include the extracted timing model (ETM), the interface logic model (ILM), and the hyperscale model. These categories of timing models, however, have some problems, such as including excessive non-necessary cells or inadequate necessary cells, inadequate consideration for cross-coupled effects between cells, etc. Therefore, when performing STA with the above categories of timing models, a considerable amount of time still is needed and an accurate analysis result for signal integrity cannot be obtained.

SUMMARY

The disclosure provides a timing model building method for building a timing model corresponding to a gate-level netlist of a block. The method includes the following operations: utilizing a processor to generate an interface net of the gate-level netlist, where if the gate-level netlist comprises an unconstrained clock tree and a boundary timing constraint information of the gate-level netlist does not comprise a timing constraint of the unconstrained clock tree, the interface net comprises none of cells of the gate-level netlist driven by the unconstrained clock tree; utilizing the processor to generate an identified internal net of the gate-level netlist, where the identified internal net is cross-coupled to the interface net; and utilizing the processor to generate the timing model according to the interface net and the identified internal net.

The disclosure provides a top-level analysis method including the following operations: dividing a circuit design into a plurality of blocks; utilizing a processor to read a gate-level netlist, a parasitic element information, and a boundary timing constraint information of one of the plurality of blocks; utilizing the processor to build a timing model corresponding to the gate-level netlist, wherein the timing model comprises an interface net and an identified internal net of the gate-level netlist, and the identified internal net is cross-coupled to the interface net; and utilizing the timing model to perform a top-level analysis for the circuit design. If the gate-level netlist comprises an unconstrained clock tree and boundary timing constraint information of the gate-level netlist does not comprise a timing constraint of the unconstrained clock tree, the interface net comprises none of cells of the gate-level netlist driven by the unconstrained clock tree.

The disclosure provides a timing model including an interface net of a gate-level netlist corresponding to a block and an identified internal net. if the gate-level netlist comprises an unconstrained clock tree and a boundary timing constraint information of the gate-level netlist does not comprises a timing constraint of the unconstrained clock tree, the interface net comprises none of cells of the gate-level netlist driven by the unconstrained clock tree are excluded from. The identified internal net is cross-coupled to the interface net.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
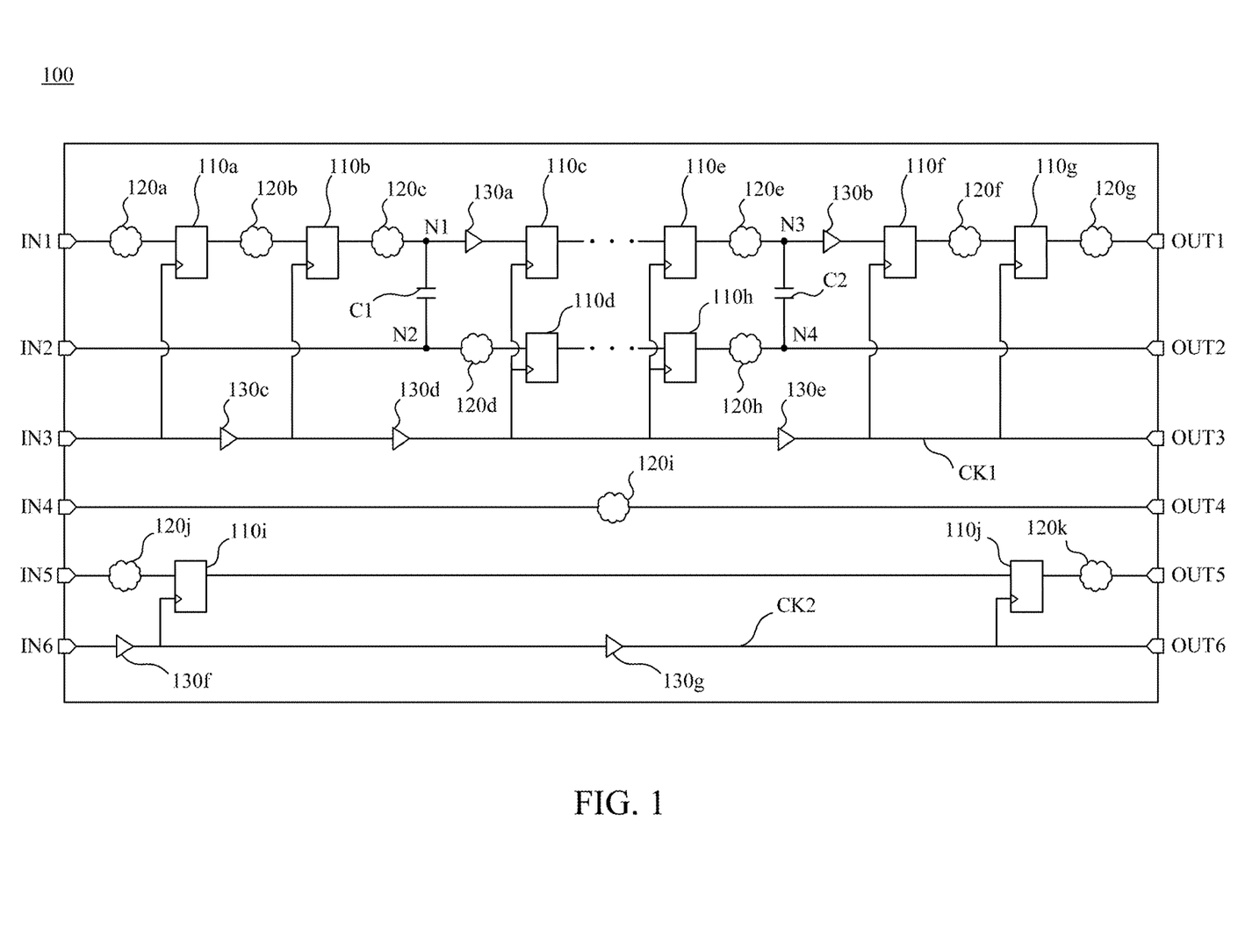
FIG. 1 is a simplified schematic diagram of a gate-level netlist of a block according to one embodiment of the present disclosure.

FIG. 1 is a simplified schematic diagram of a gate-level netlist 100 of a block according to one embodiment of the present disclosure. The gate-level netlist 100 records a complete circuit design for realizing the block. The gate-level netlist 100 comprises first through sixth input nodes IN1, IN2, IN3, IN4, IN5, and IN6, and first through sixth output nodes OUT1, OUT2, OUT3, OUT4, OUT5, and OUT6. The gate-level netlist 100 further comprises a plurality of registers 110a-110j, a plurality of combinational logic elements 120a-120j, and a plurality of buffers 130a-130g. The third input node IN3 and the sixth input node IN6 are configured to provide a first clock tree CK1 and a second clock tree CK2, respectively.

The capacitors C1 and C2 shown in FIG. 1 are merely used to illustrate the cross-coupling effect among different timing paths of the gate-level netlist 100, and are not actual and necessary circuit components of the gate-level netlist 100. In addition, each of the registers 110a-110j can be realized by a flip-flop.

Figure 2:
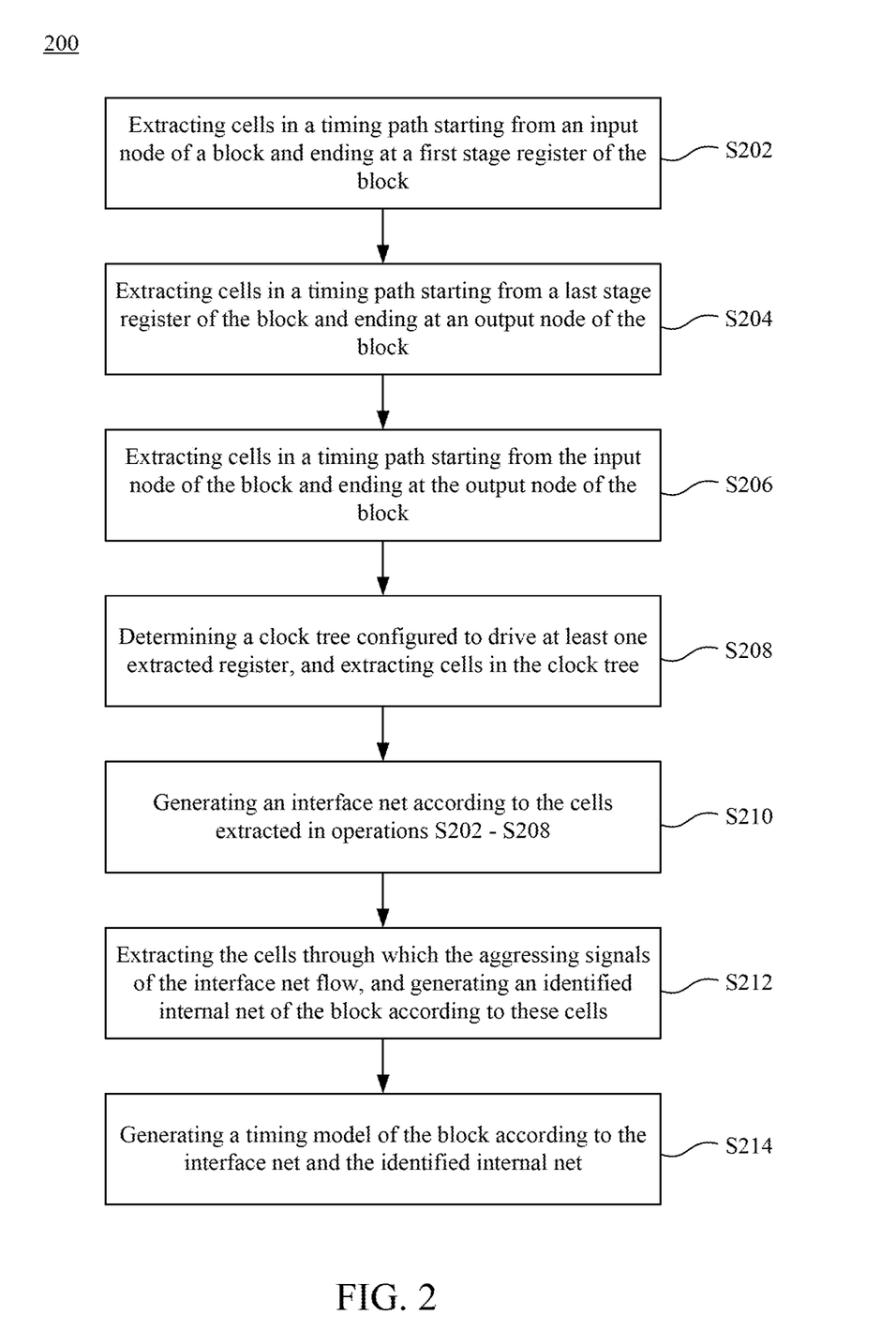
FIG. 2 is a flowchart of a timing model building method according to one embodiment of the present disclosure.

Before performing the top-level analysis, the block-level analysis may be performed for the gate-level netlist 100, so as to obtain a simplified timing model corresponding to the gate-level netlist 100. FIG. 2 is a flowchart of a timing model building method 200 according to one embodiment of the present disclosure. In this embodiment, the timing model building method 200 is conducted by a processor (not shown in FIG. 1). In other embodiments, the timing model building method 200 may, however, conducted by the application-specific integrated circuit (ASIC), field programmable gate array (FPGA), or other integrated module having data processing ability and supported by a non-violated memory device.

In operation S202, the processor determines a first timing path starting from an input node of the gate-level netlist 100 and ending at a first stage register of the gate-level netlist 100, and then the processor extracts cells in the first timing path.

In operation S204, the processor determines a second timing path starting from the last stage register of the gate-level netlist 100 and ending at an output node of the gate-level netlist 100, and then the processor extracts cells in the second timing path.

In operation S206, the processor determines a third timing path starting from the input node of the gate-level netlist 100 and ending at the output node of the gate-level netlist 100, and then the processor extracts cells in the third timing path.

In operation S208, the processor determines a clock tree configured to drive at least one register determined in operations S202 through S206, and then the processor extracts cells in the determined clock tree.

In operation S210, the processor generates an interface net of the gate-level netlist 100 according to the plurality of cells extracted in operations S202 through S208. Notably, the processor may load, in advance, the boundary timing constraint information of the block. The boundary timing constraint information comprises arrival times of the input nodes of the gate-level netlist 100, and also comprises required arrival times defined by circuits coupled with the output nodes of the gate-level netlist 100. If the timing constraints of a clock tree are not recorded in the boundary timing constraint information, the clock tree is herein after referred to as an "unconstrained clock tree." When executing the timing model building method 200, the processor would not extract the cells driven by the unconstrained clock tree.

In operation S212, the processor determines aggressing signals corresponding to the interface net generated in operation S210, and then the processor extracts the cells, from the gate-level netlist 100, through which the aggressing signals flow. The processor further generates an identified internal net of the gate-level netlist 100 according to the extracted cells. In other words, the identified internal net is cross-coupled to the interface net.

In operation S214, the processor generates the timing model of the block according to the interface net and the identified internal net.

Figure 3A:
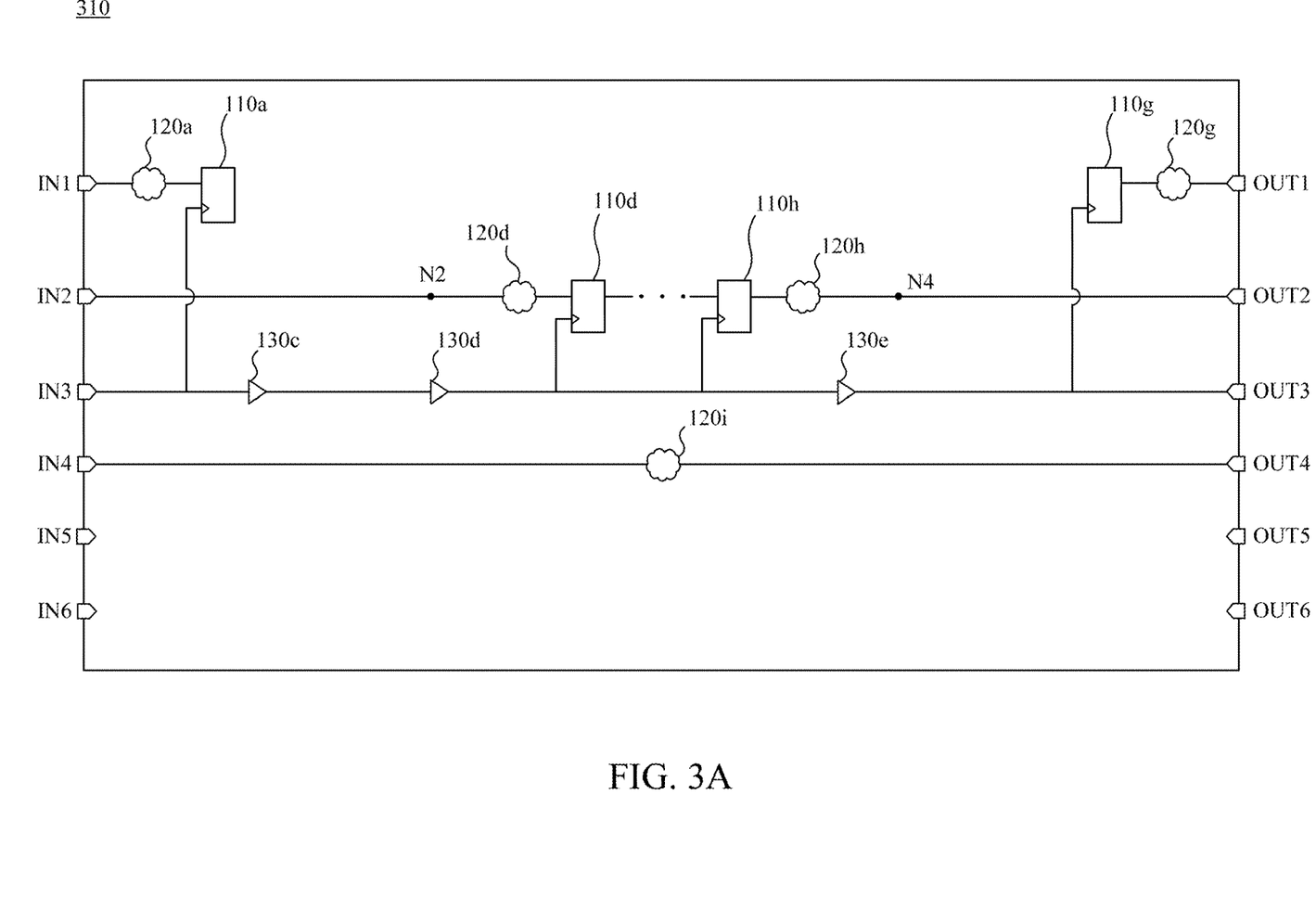
FIG. 3A is a simplified schematic diagram of an interface net corresponding to the gate-level netlist of FIG. 1.

FIG. 3A is a simplified schematic diagram of an interface net 310 corresponding to the gate-level netlist 100. According to operations S202 through S210, the register 110a is a first stage register in the timing path starting from the first input node IN1, and thus the interface net 310 comprises the register 110a and the combinational logic element 120a. The register 110d is a first stage register in a timing path starting from the second input node IN2, and thus the interface net 310 comprises the register 110d and the combinational logic element 120d. The register 110g is a last stage register in a timing path ending at the first output node OUT1, and thus the interface net 310 comprises the register 110g and the combinational logic element 120g. The register 110h is a last stage register in a timing path ending at the second output node OUT2, and thus the interface net 310 comprises the register 110h and the combinational logic element 120h.

The combinational logic element 120i is in a timing path starting from the fourth input node IN4 and ending at the fourth output node OUT4, and thus the interface net 310 comprises the combinational logic element 120i. the first clock tree CK1 is configured to drive the registers 110a, 110d, 110g, and 110h, and thus the interface net 310 comprises the buffers 130c-130e in the first clock tree CK1. In this embodiment, the second clock tree CK2 is an unconstrained clock tree. Therefore, the interface net 310 would not comprise the registers 110i-110j, the combinational logic elements 120j-120k, and the buffers 130f-130g driven by the second clock tree CK2.

Reference is made to FIGS. 1 and 3A, signals flowing through the first node N1 transit before the transiting of the signals flowing through the second node N2 of the interface net 310. Therefore, the signals flowing through the first node N1 are the aggressor signals of the interface net 310. According to operation S212, the processor may extract the register 110b, the combinational logic element 120c, and the buffer 130a that are in the same timing path with the first node N1, and extract buffers 130c-130e in the related timing path, so as to form the identified internal net 320 of FIG. 3B.

Figure 3B:
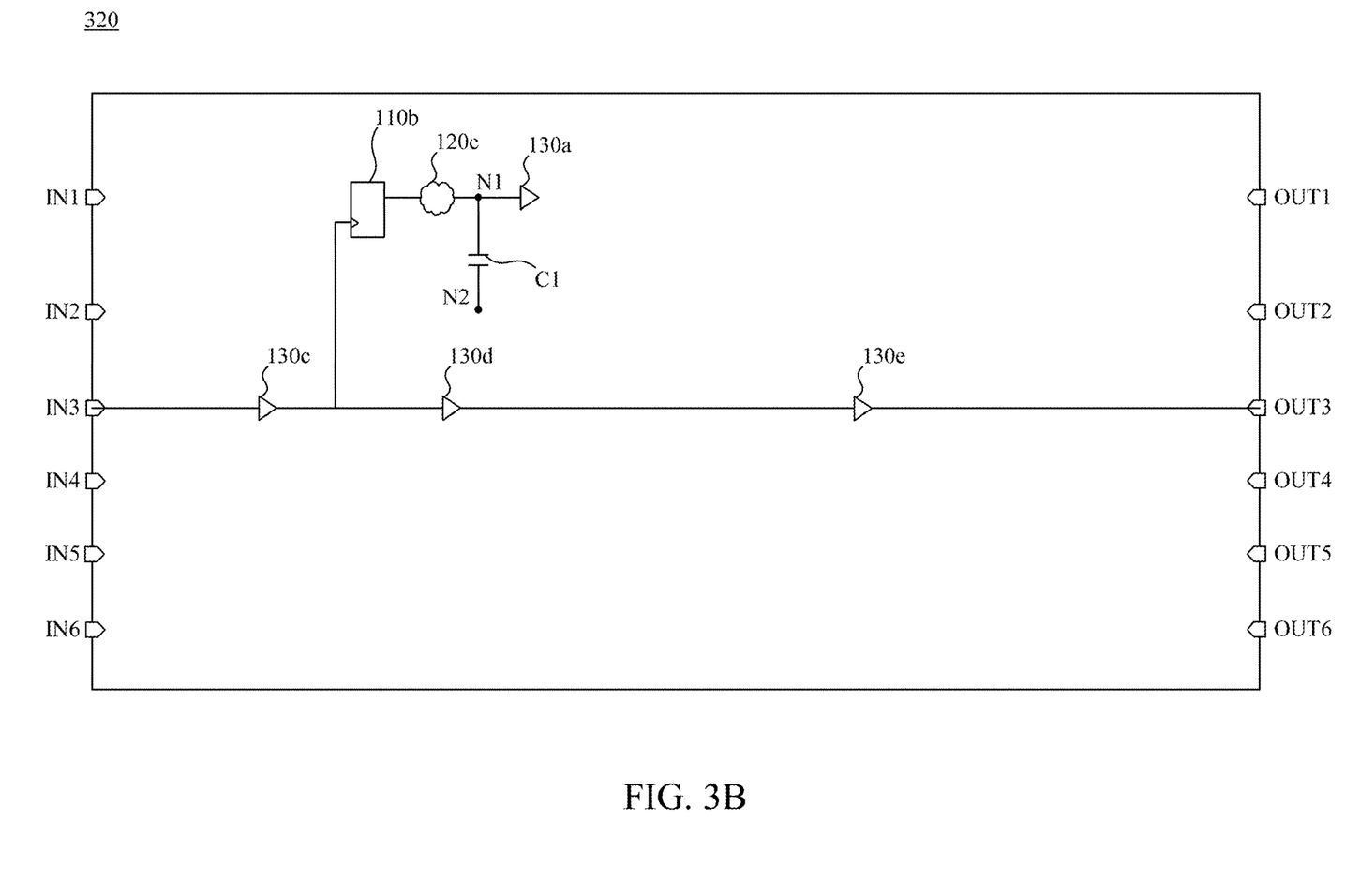
FIG. 3B is a simplified schematic of an identified internal net corresponding to the gate-level netlist of FIG. 1.

Reference is again made to FIGS. 1 and 3A, since signals flowing through the third node N3 transit after the transiting of the signals flowing through the fourth node N4 of the interface net 310, the signals flowing through the third node N3 are victim signals of the interface net 310. Therefore, the identified internal net 320 would not comprise the register 110e, the combinational logic element 120e, and the buffer 130b that are in the same timing path with the third node N3.

Figure 4:
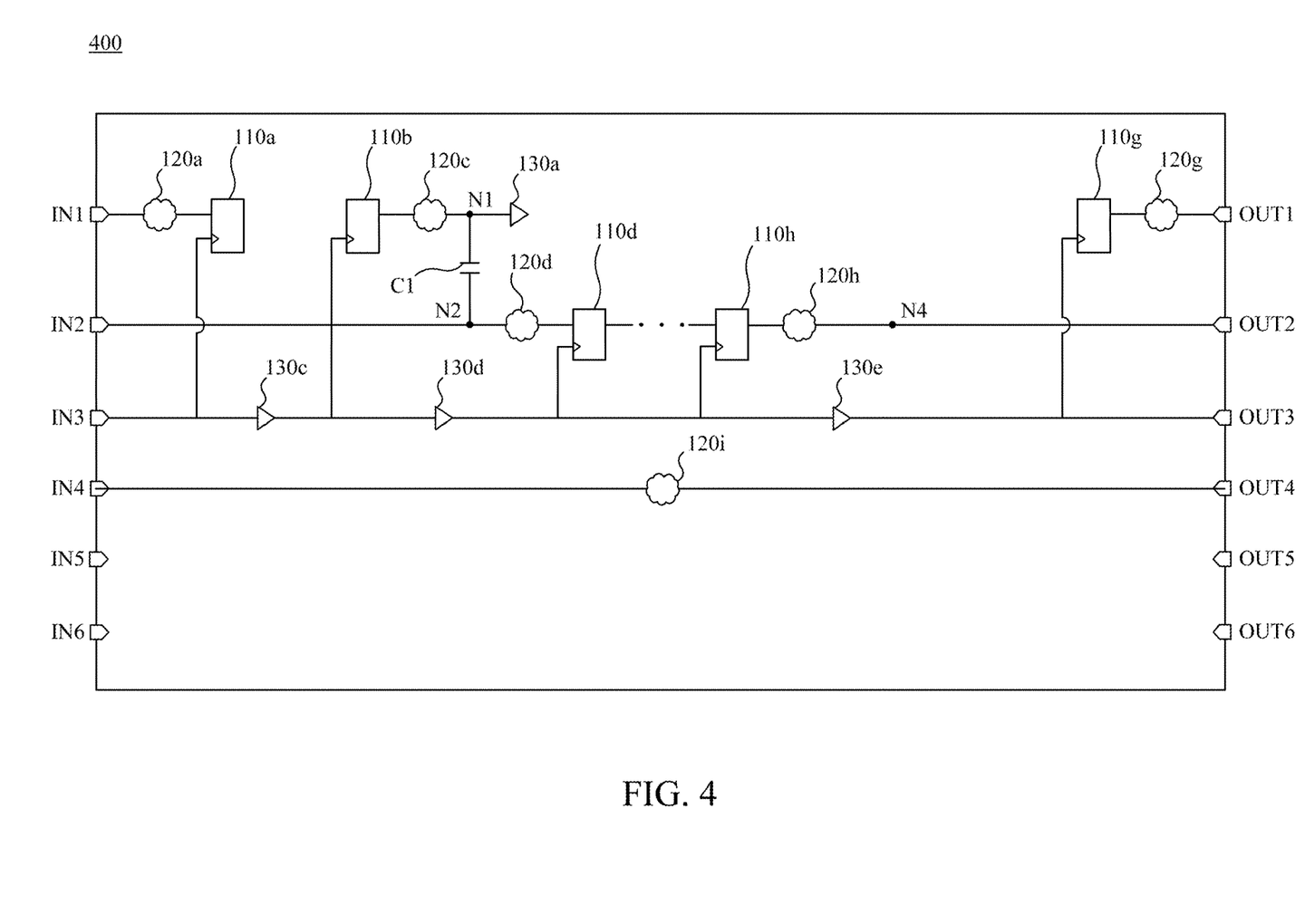
FIG. 4 is a simplified schematic diagram of a timing model corresponding to the gate-level netlist of FIG. 1.

FIG. 4 is a simplified schematic diagram of a timing model 400 corresponding to the gate-level netlist 100. The timing model 400 is generated, by the processor, according to the interface net 310 and the identified internal net 320. As aforementioned, the timing model 400 comprises the cross-coupled information of the timing paths in the block, and comprises none of the cells driven by the unconstrained clock tree, e.g., the second clock tree CK2. Therefore, the timing model 400 facilitates the accuracy of the top-level analysis, and provides contribution to the decreasing of time required for the top-level analysis.

Figure 5:
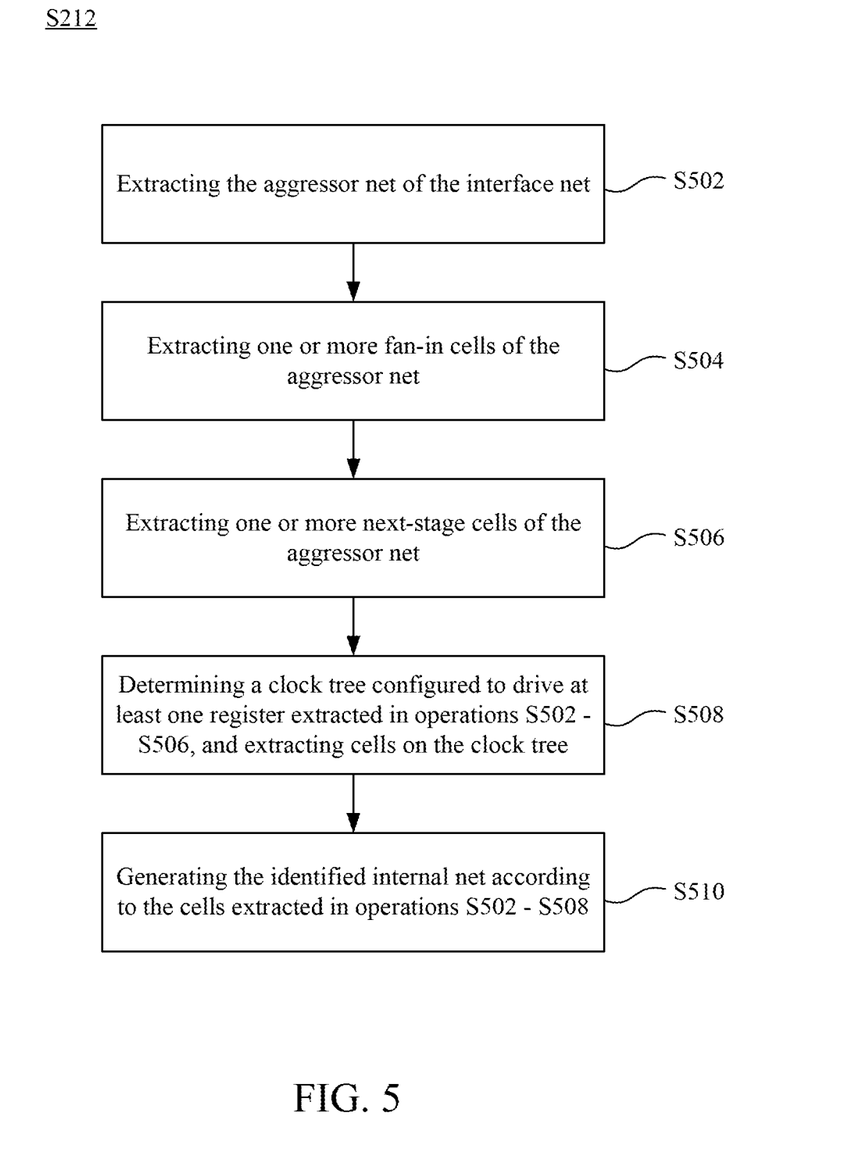
FIG. 5 is a flowchart for illustrating the details of operation S212 according to one embodiment of the present disclosure.

FIG. 5 is a flowchart for illustrating the details of operation S212 according to one embodiment of the present disclosure. In operation S502, the processor extracts, from the gate-level netlist 100, the aggressor net of the interface net 310 according to the timing paths through which the aggressor signals of the interface net 310 flow, such as the combinational logic element 120c of FIG. 3B.

In operation S504, the processor extracts one or more fan-in cells of the aggressor net from the gate-level netlist 100, such as the register 110b of FIG. 3B. The arrival time and the transition time for each fan-in cell are annotated at the input node of the corresponding fan-in cell. As a result, during the top-level analysis, the characteristics of the signals flowing through the aggressor net can be precisely provided.

In operation S506, the processor extracts one or more next-stage cells of the aggressor net from the gate-level netlist 100, such as the buffer 130a of FIG. 3B.

Then, the processor conducts operation S508 to determine, from the gate-level netlist 100, a clock tree configured to drive at least one register extracted in operations S502 through S506. The processor further extracts cells in the determined clock tree. As shown in FIG. 3B, the first clock tree CK1 is configured to drive the register 110b, and thus the processor may extract the buffers 130c-130e.

In S510, the processor generates the identified internal net according to the cells extracted in operations S502 through S508, such as the identified internal net 320 of FIG. 3B.

Figure 6:
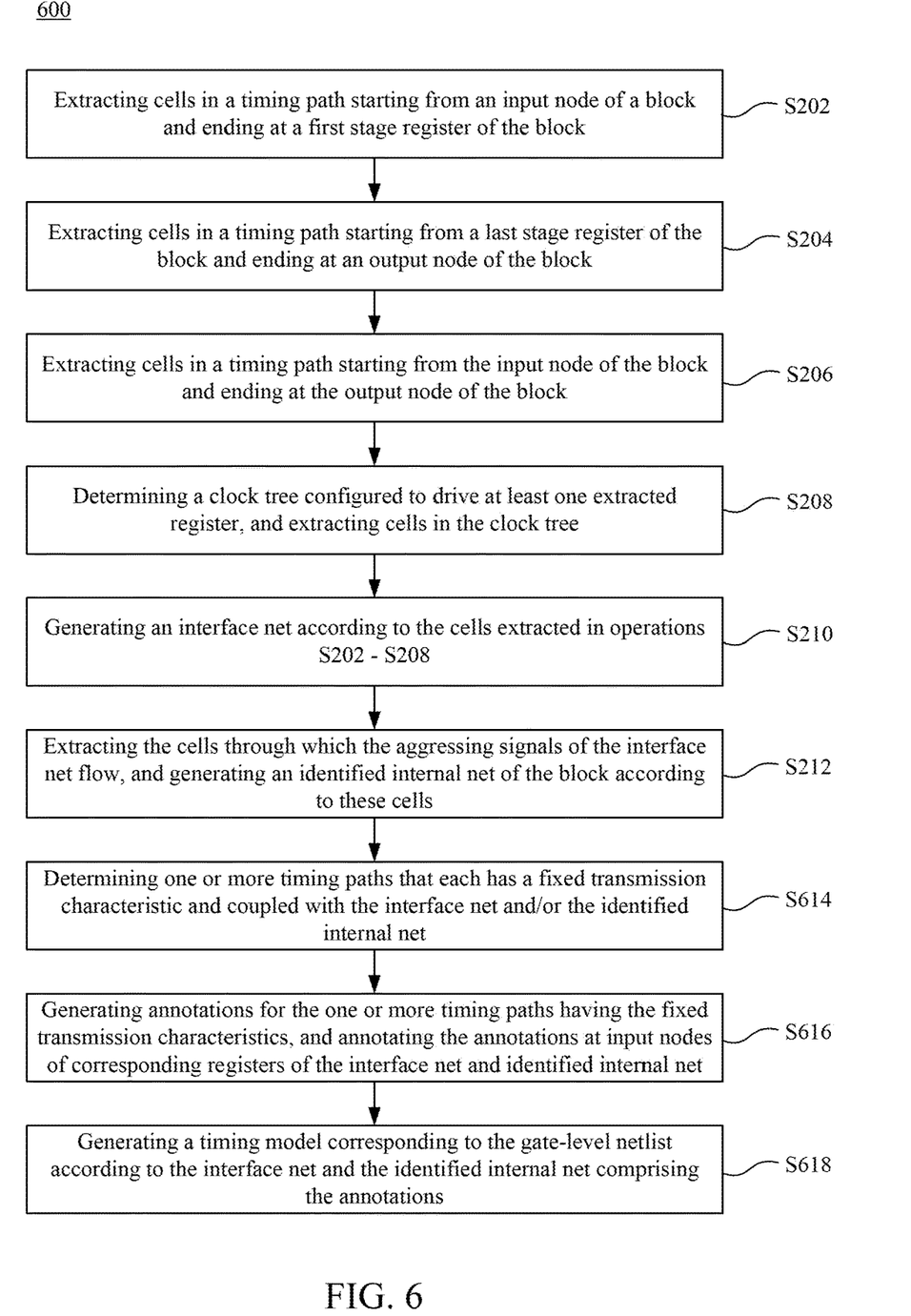
FIG. 6 is a flowchart of a timing model building method according to one embodiment of the present disclosure.

FIG. 6 is a flowchart of a timing model building method 600 according to one embodiment of the present disclosure. Operations S202 through S212 of the timing model building method 600 are similar to the corresponding operations of the timing model building method 200, respectively, and those descriptions will not be repeated here for the sake of brevity. In operation S614, the processor determines one or more timing paths that each has a fixed transmission characteristic and coupled with the interface net and/or the identified internal net. The fixed transmission characteristic indicates that when a corresponding signal is transmitted on the timing path, the arrival time and the transition time of the corresponding signal will not be affected by the operation of the cells of the gate-level netlist.

Then, in operation S616, the processor generates annotations for the one or more timing paths having the fixed transmission characteristics, and the processor further annotates the annotations at the input nodes of the corresponding registers of the interface net and at the input nodes of the corresponding registers of the identified internal net. Moreover, the processor would not extract the cells in the timing paths having the fixed transmission characteristics.

In operation S618, the processor generates a timing model corresponding to the gate-level netlist according to the interface net and the identified internal net comprising the annotations.

Figure 7:
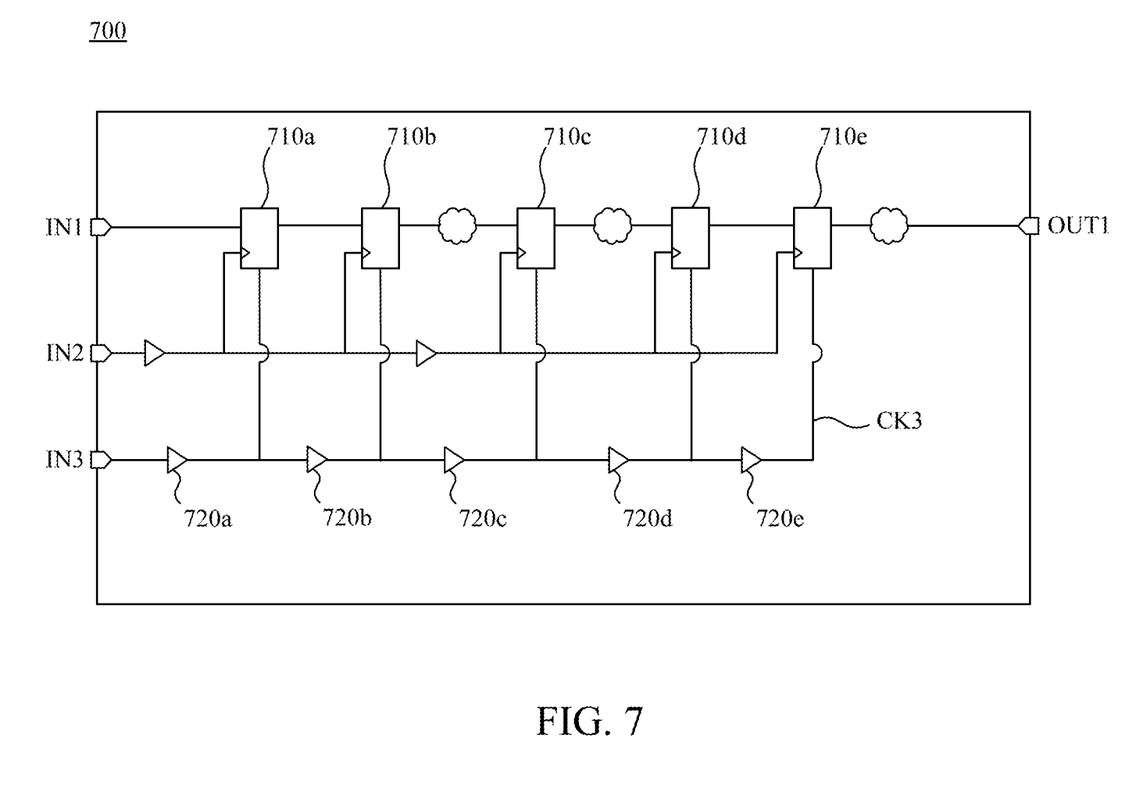
FIG. 7 is a simplified schematic diagram of a gate-level netlist of a block according to one embodiment of the present disclosure.
Figure 8:
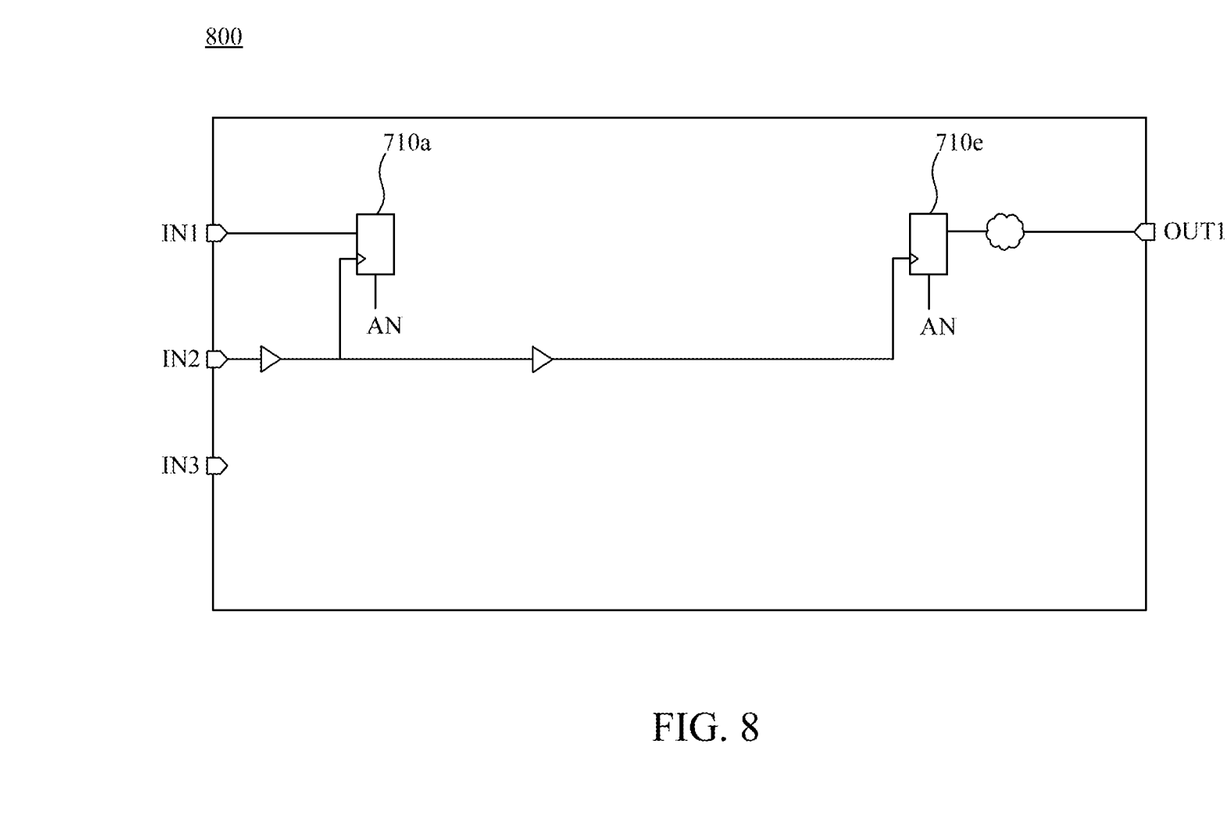
FIG. 8 is a simplified schematic diagram of a timing model corresponding to the gate-level netlist of FIG. 7.

FIG. 7 is a simplified schematic diagram of a gate-level netlist 700 of a block according to one embodiment of the present disclosure. The gate-level netlist 700 comprises a third clock tree having a fixed transmission characteristic. FIG. 8 is a simplified schematic diagram of a timing model 800 corresponding to the gate-level netlist 700. According to S618, since the input nodes of the registers 710a and 710e are coupled with the third clock tree CK3, the processor generates an annotation AN corresponding to the third clock tree CK3 and annotates the annotation AN at the input nodes of the registers 710a and 710e. Furthermore, the processor would not extract the cells in the third clock tree CK3, such as the buffers 720a-720e. As a result, the number of components of the timing model 800 can be further reduced, while the accuracy of the top-level analysis is not being affected.

In one embodiment, the annotation annotated at the input nodes of the registers 710a and 710e comprises arrival times and transition times, where the arrival times and the transition times are constants.

As can be appreciated from the foregoing descriptions, the timing model building methods 200 and 600 not only can generate a concise timing model without sacrificing the accuracy of the STA, but also can increase the accuracy of the STA by involving the cross-coupled effect between the timing paths into the timing model. Therefore, the timing model building methods 200 and 600 can significantly save the required hardware resource and time when the STA is performed, and are applicable to a complex integrated circuit design.

Figure 9:
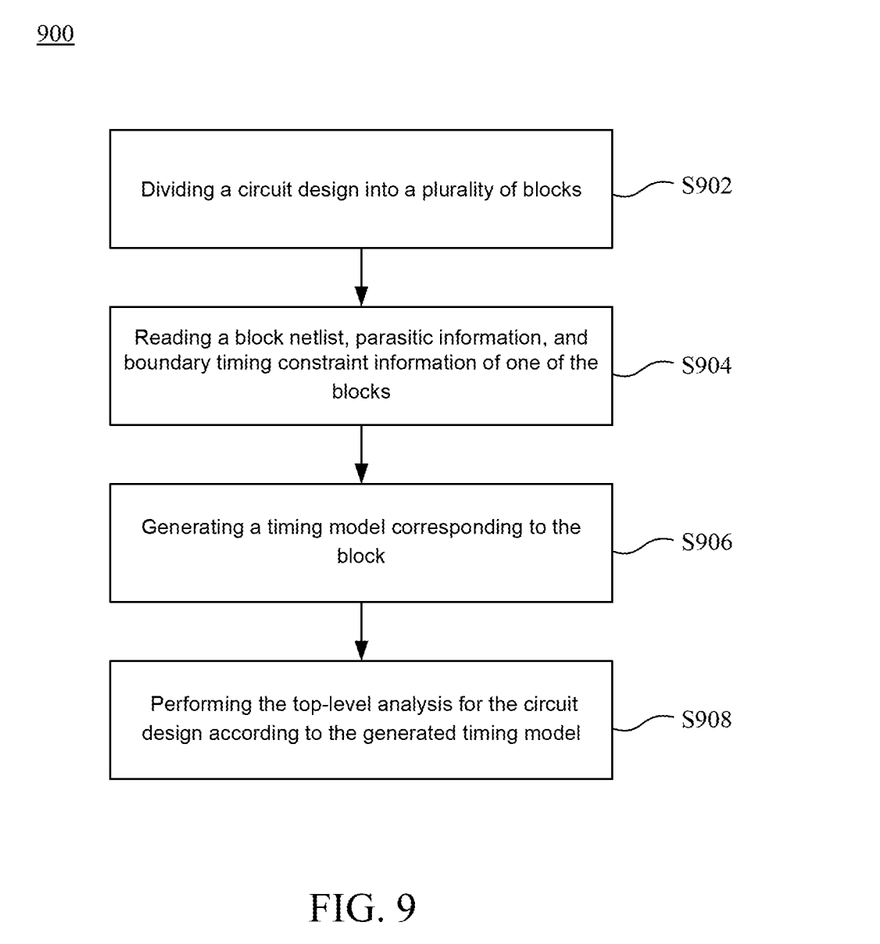
FIG. 9 is a flowchart of a top-level analysis method according to one embodiment of the present disclosure.

FIG. 9 is a flowchart of a top-level analysis method 900 according to one embodiment of the present disclosure. The top-level analysis method 900 is applicable to the hierarchical integrated circuit design, and may be executed by a processor. The top-level analysis method 900 also may be executed by, however, the ASIC, the FPGA, or other integrated module having data processing ability and supported by a non-violated memory device.

In operation S902, the processor divides a circuit design into a plurality of blocks. In operation S904, the processor reads a block netlist, parasitic information, and boundary timing constraint information of one of the blocks. The parasitic information may be used to determine the cross-coupled effect among different timing paths of the one of the block.

In operation S906, the processor generates a timing model corresponding to the block. Operation S906 may be realized by the aforementioned timing model building methods 200 or 600. Then, the processor conducts operation S908 to perform the top-level analysis for the circuit design according to the generated timing model.

The execution orders of each of the aforementioned flowcharts are merely exemplary embodiments, and are not intend to restrict the practical implementations of this disclosure. For example, in the aforementioned flowcharts, operations S202-S206 may be conducted in parallel, and operations S502-S506 may also be conducted in parallel.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A timing model building method, for building a timing model corresponding to a gate-level netlist of a block, comprising:
utilizing a processor to generate an interface net of the gate-level netlist, wherein if the gate-level netlist comprises an unconstrained clock tree having a timing constraint in which not comprised by boundary timing constraint information of the block, the interface net does not comprises the unconstrained clock tree and cells of the gate-level netlist driven by the unconstrained clock tree;
utilizing the processor to generate an identified internal net of the gate-level netlist, wherein the identified internal net is cross-coupled to the interface net; and
utilizing the processor to generate the timing model according to the interface net and the identified internal net.

2. The method of claim 1, wherein utilizing the processor to generate the interface net of the gate-level netlist comprises:
extracting a plurality of cells on a first timing path, wherein the first timing path starts at an input node of the gate-level netlist and ends at a first register of the gate-level netlist;
extracting a plurality of cells on a second timing path, wherein the second timing path starts at a second register of the gate-level netlist and ends at an output node of the gate-level netlist;
extracting a plurality of cells on a third timing path, wherein the third timing path starts at the input node of the gate-level netlist and ends at the output node of the gate-level netlist; and
extracting a clock tree configured to drive at least one register of the interface net.

3. The method of claim 2, wherein the first register is a first stage register, and the second register is a last stage register.

4. The method of claim 1, wherein signals of the identified internal net transit before transiting of signals of the interface net.

5. The method of claim 4, wherein utilizing the processor to generate the identified internal net of the gate-level netlist comprises:
extracting an aggressor net, wherein the aggressor net is coupled with a first node cross-coupled to the interface net, and signals of the first node transit before the transiting of the signals of the interface net;
extracting a fan-in cell of the aggressor net;
extracting a next-stage cell of the aggressor net; and
extracting a clock tree configured to drive at least one register of the identified internal net.

6. The method of claim 1, further comprising:
generating an annotation, wherein the annotation comprises an arrival time of the interface net or the identified internal net, and the arrival time is a constant.

7. The method of claim 6, wherein the arrival time is annotated at an input node of a register of the interface net or the identified internal net.

8. A top-level analysis method, comprising:
dividing a circuit design into a plurality of blocks;
utilizing a processor to read a gate-level netlist, parasitic element information, and boundary timing constraint information of one of the plurality of blocks;
utilizing the processor to build a timing model corresponding to the gate-level netlist, wherein the timing model comprises an interface net and an identified internal net of the gate-level netlist, and the identified internal net is cross-coupled to the interface net; and
utilizing the timing model to perform a top-level analysis for the circuit design,
wherein if the gate-level netlist comprises an unconstrained clock tree having a timing constraint in which not comprised by the boundary timing constraint information of the one of the plurality of blocks, the interface net does not comprises the unconstrained clock tree and cells of the gate-level netlist driven by the unconstrained clock tree.

9. The method of claim 8, wherein the interface net comprises:
a plurality of cells in a first timing path, wherein the first timing path starts from an input node of the gate-level netlist and ends at a first register of the gate-level netlist;
a plurality of cells in a second timing path, wherein the second timing path starts from a second register of the gate-level netlist and ends at an output node of the gate-level netlist;
a plurality of cells in a third timing path, wherein the third timing path starts from the input node of the gate-level netlist and ends at the output node of the gate-level netlist; and
a clock tree, configured to drive at least one register of the interface net.

10. The method of claim 9, wherein the first register is a first stage register, and the second register is a last stage register.

11. The method of claim 8, wherein signals of the identified internal net transit before transiting of signals of the interface net.

12. The method of claim 11, wherein the identified internal net comprises:
an aggressor net, wherein the aggressor net is coupled with a first node cross-coupled to the interface net, and signals of the first node transit before the transiting of the signals of the interface net;
a fan-in cell of the aggressor net;
a next-stage cell of the aggressor net; and
a clock tree, configured to drive at least one register of the identified internal net.

13. The method of claim 8, further comprising:
generating an annotation of the timing model, wherein the annotation comprises an arrival time of the interface net or the identified internal net, and the arrival time is a constant.

14. The method of claim 13, wherein the arrival time is annotated at an input node of a register of the interface net or the identified internal net.

15. A timing model, comprising:
an interface net of a gate-level netlist corresponding to a block, wherein if the gate-level netlist comprises an unconstrained clock tree having a timing constraint in which not comprised by boundary timing constraint information of the block, the interface net does not comprises the unconstrained clock tree and cells of the gate-level netlist driven by the unconstrained clock tree; and
an identified internal net corresponding to the gate-level netlist, wherein the identified internal net is cross-coupled to the interface net.

16. The timing model of claim 15, wherein the interface net comprises:

a plurality of cells in a first timing path, wherein the first timing path starts from an input node of the gate-level netlist and ends at a first register of the gate-level netlist;

a plurality of cells in a second timing path, wherein the second timing path starts from a second register of the gate-level netlist and ends at an output node of the gate-level netlist;

a plurality of cells in a third timing path, wherein the third timing path starts from the input node of the gate-level netlist and ends at the output node of the gate-level netlist; and a clock tree, configured to drive at least one register of the interface net.

17. The timing model of claim 16, wherein the first register is a first stage register, and the second register is a last stage register.

18. The timing model of claim 15, wherein signals of the identified internal net transit before transiting of signals of the interface net.

19. The timing model of claim 18, wherein the identified internal net comprises:

an aggressor net, wherein the aggressor net is coupled with a first node cross-coupled to the interface net, and signals of the first node transit before the transiting of the signals of the interface net;

a fan-in cell of the aggressor net;

a next-stage cell of the aggressor net; and a clock tree, configured to drive at least one register of the identified internal net.

20. The timing model of claim 15, wherein an annotation is annotated at an input node of a register of the interface net or the identified internal net, the annotation comprises an arrival time corresponding to the input node of the register, and the arrival time is a constant.

* * * * *